United States Patent [19]

Matsushima

[11] Patent Number: 5,208,781
[45] Date of Patent: May 4, 1993

[54] MEMORY DEVICE WITH STANDBY FUNCTION

[75] Inventor: Osamu Matsushima, Tokyo, Japan
[73] Assignee: NEC Corporation, Tokyo, Japan
[21] Appl. No.: 704,157
[22] Filed: May 22, 1991
[30] Foreign Application Priority Data
May 22, 1990 [JP] Japan .................... 2-131814
[51] Int. Cl.[5] ............................. G11C 8/02
[52] U.S. Cl. .................... 365/230.01; 365/230.06; 365/227; 365/236
[58] Field of Search .......... 365/230.01, 230.06, 365/227, 236

[56] References Cited

U.S. PATENT DOCUMENTS 4,561,070 12/1985 Armstrong .......................... 365/227

OTHER PUBLICATIONS

"Low Power Decoding Scheme for Partitioned Arrays," IBM Tech Disc. Bul. vol. 29 No. 4, Sep. 1986 1533-1535.

Primary Examiner—William L. Sikes
Assistant Examiner—Margaret Rose Wambach
Attorney, Agent, or Firm—Sughrue, Mion, Zinn, Macpeak & Seas

[57] ABSTRACT

A memory device includes a memory, an address latch, a built-in incrementer, and an address decoder. The address decoder has a mapping register which assigns the memory to a predetermined address. The address decoder further includes a standby signal producer which detects whether or not the address latch addresses an address specified by the mapping register and which sets the memory device to a standby state of a low power consumption when such is not detected. The memory device can be set to a standby state even when the memory device is connected to a microcomputer with a protocol by which an address of the memory is not outputted each time. This arrangement enables to save power consumption of the computer, to decrease the load of a power supply circuit in a microcomputer applied apparatus and to make the apparatus compact.

5 Claims, 4 Drawing Sheets

MEMORY DEVICE WITH STANDBY FUNCTION

BACKGROUND OF THE INVENTION

The present invention relates to a memory device and, more particularly, to a memory device with a standby function which is connected to a microcomputer.

A conventional memory device connected to a microcomputer has a built-in chip enable terminal (hereinafter simply referred to as "CE" terminal) which sets the memory device to a standby state in order to prevent wasteful power consumption when a memory included in the memory device is not selected. In a conventional microcomputer applied system, an address outputted from the microcomputer is decoded by means of an external circuit. If the address outputted does not specify an address of the memory included in the memory device, the CE terminal is set inactive so that the memory device is set to a standby state. Recently, however, in order to dissolve a bus bottleneck in a microcomputer applied system, there has been developed and been in practical use a process in which a special protocol is introduced between the microcomputer and the memory device, and a read address for the memory is not outputted each time from the microcomputer but only instruction codes flow through a bus sequentially. Since this process has a built-in address pointer which holds the address on the side of the memory device and is incremental in response to a synchronous signal from the microcomputer, it is not necessary to output the address each time from the microcomputer. Therefore, it is possible to supply the microcomputer with instruction codes efficiently. It is, however, impossible to decode the address by means of the external circuit mentioned above to set the memory device to a standby state.

As explained above, the conventional process which does not output the read address from the microcomputer to an external unit in order to overcome a bus bottleneck has a problem in that, even if the microcomputer itself assumes a standby state of a low power consumption, total power consumption of the microcomputer applied system as a whole does not decrease due to a lack of a process which sets the memory device to a standby state. Therefore, a power supply circuit of the microcomputer applied system and a backup circuit against a power breakdown become large-scale, which results in an increase in the cost of manufacturing the system.

SUMMARY OF THE INVENTION

It is, therefore, an object of the present invention to overcome the problems existing in the conventional arrangement and to provide an improved memory device.

It is another object of the present invention to provide a memory device which enables to decrease power consumption in a microcomputer, to decrease the load on a power supply circuit in a microcomputer applied system and to make the system compact.

It is a further object of the present invention to provide a memory device which can be set to a standby state even when the memory device is connected to the microcomputer with a protocol by which a memory address is not set to be outputted each time.

In carrying out the above and other objects of the present invention in one form, there is provided an improved memory device in which a memory means, an address means having an increment means and an address decoding means are installed on the same semiconductor substrate, the address decoding means comprising:

a mapping means which assigns the memory means to a predetermined address; and a standby means which detects whether the address means is specifying an address assigned by the mapping means and which outputs a standby signal to set the memory device to a standby state of low power consumption when the standby means does not detect the address means specifying the address assigned by the mapping means.

According to the memory device of the present invention, as described above, it is possible to set the memory device to a standby state even when the memory device is connected to a microcomputer with a protocol which renders a memory address not to be outputted each time. This enables to save power consumption of the computer, to decrease the load of a power supply circuit in a microcomputer applied apparatus and to make the apparatus compact.

BRIEF DESCRIPTION OF THE DRAWINGS

The above and other objects, features and advantages of the present invention will be apparent from the following description of preferred embodiments according to the present invention explained with reference to the accompanying drawings, in which.

PREFERRED EMBODIMENTS OF THE INVENTION

Now, embodiments of the present invention will be described in detail with reference to FIGS. 1 to 4.

Figure 1:
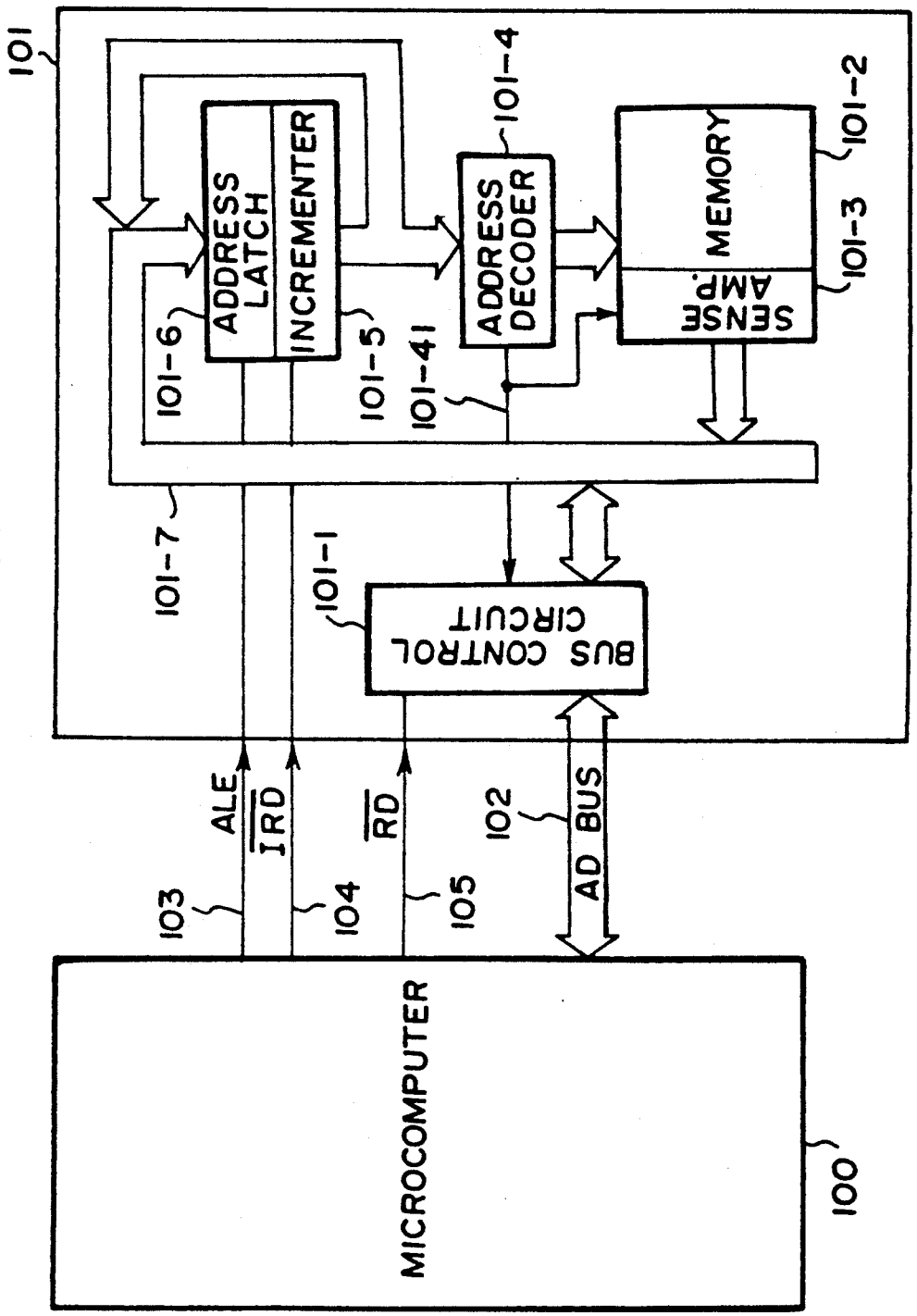
FIG. 1 shows a schematic view of a microcomputer applied system including a memory device as a first embodiment according to the present invention.

FIG. 1 shows a schematic view of a microcomputer applied system including a memory device as a first embodiment according to the present invention. This system comprises a microcomputer 100 and a memory chip 101, which is a memory device as a first embodiment of the present invention. The microcomputer 100 which can control a memory space of 64 k bytes is connected to the memory chip 101 by an AD bus 102 which is a multibus of an address/data signal and control lines of an ALE signal 103, an $\overline{IRD}$ signal 104 and an $\overline{RD}$ signal 105. The memory chip 101 comprises a 18 k bytes memory 101-2 which stores instruction codes, a sense amplifier 101-3, an address decoder 101-4, an address latch 101-6, an incrementer 101-5 and a bus control circuit 101-1, all of which are connected to each other by an internal bus 101-7. Only when the microcomputer 100 has executed a jump instruction etc. and has not conducted the sequential reading of instruction codes, the ALE signal 103 becomes a logical value "1", so that an address is loaded through the AD bus 102 and the bus control circuit 101-1 to the address latch 101-6 in the memory chip 101. The loaded address is inputted to the address decoder 101-4 through the incrementer 101-5 so that a predetermined memory cell in the memory 101-2 is selected. The contents of the selected memory cell is read out by means of the sense amplifier 101-3. In the case where the $\overline{RD}$ signal 105 is a logical value "0", the instruction code read out is transferred to the AD bus 102 through the internal bus 101-7 and the bus control circuit 101-1. After the loading operation of address as explained above, the incrementer 101-5 increments an output of the address latch 101-6 in synchronization with the $\overline{IRD}$ signal 104 outputted from the microcomputer 100 so that instruction codes can be read out sequentially. The address decoder 101-4 is always monitoring whether or not an output of the incrementer 101-5 specifies an address of the memory 101-2 included in the memory chip 101. When the address outputted exceeds the range of addresses of the memory 101-2 included in the memory chip 101, the address decoder 101-4 detects the excess and sets a standby signal 101-41 at a logical value "1" so that the sense amplifier 101-3 and the bus control circuit 101-1 are set to a standby state. This enables to save most of the power which would be consumed by the memory chip 101.

Figure 2:
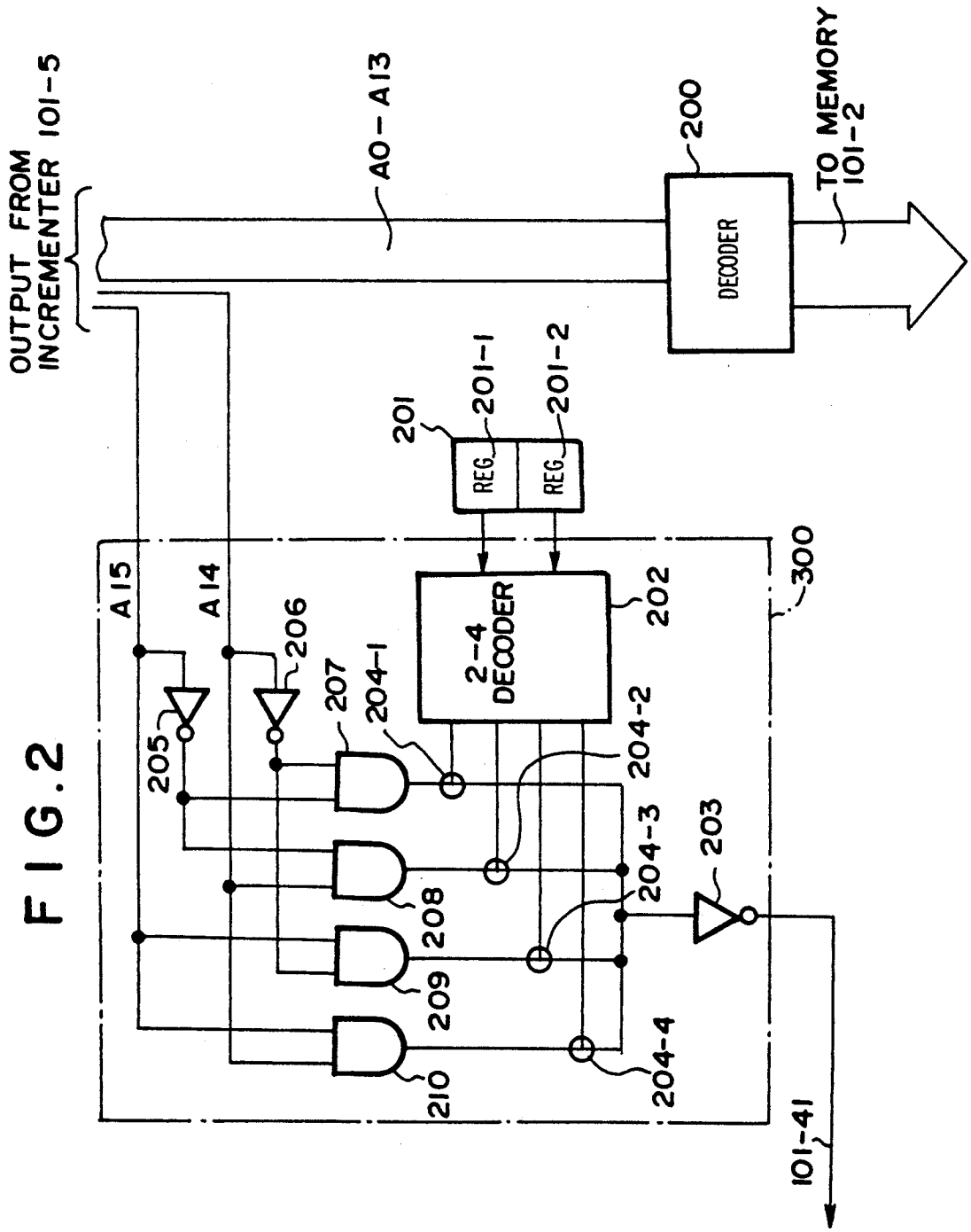
FIG. 2 shows a diagrammatic view of an internal configuration of an address decoder included and shown in FIG. 1.

FIG. 2 shows an internal configuration of the address decoder 101-4 shown in FIG. 1, and the operation thereof will be explained hereinafter with reference to the figure. The address decoder 101-4 comprises an address decoder means 200 for the memory 101-2, inverters 203, 205, 206, AND gates 207 through 210, transfer gates 204-1 through 204-4, a 2-4 decoder 202, and memory addressing registers 201-1, 201-2. The inverters 202, 205, 206, the AND gates 207 through 210, the transfer gates 204-1 through 204-4, and the 2-4 decoder 202 constitute a standby signal producer 300. The memory addressing registers 201-1, 201-2 function as a mapping means 201 and specify to which address of the memory space in the microcomputer 100 the memory 101-2 included in the memory chip 101 should be assigned. Because the memory 101-2 has 16 k bytes, it is possible for the memory 101-2 to be assigned to one of the four locations given hereunder. The registers 201-1 and 201-2 specify the location as the memory address. (An address is represented in hexadecimal. Hereinafter, the hexadecimal notation is adopted for the address representation.)

1. Address 0000-3FFF
2. Address 4000-7FFF
3. Address 8000-BFFF
4. Address C000-FFFF The output of the incrementer 101-5 is of 16 bits. The identification of the memory address depends on the higher order 2 bits (A15 and A14 in FIG. 2) of the 16 bits. The AND gate 207 detects if both A14 and A15 are logical values "0". The AND gate 208 detects if A15 is a logical value "0" and A14 is a logical value "1", The AND gate 209 detects if A15 is a logical value "1" and A14 is a logical value "0". The AND gate 210 detects if both A14 and A15 are logical values "1". The 2-4 decoder 202 decodes outputs of the memory addressing registers 201-1 and 201-2 and are connected to the transfer gates 204-1 through 204-4 which select the outputs of the AND gates 207 through 210. In the case where both the memory addressing resisters 201-1 and 201-2 have logical values "0" respectively, the 2-4 decoder 202 sets the transfer gate 204-1 to a conductive state, selects the output of the AND gate 207 and outputs it as a standby signal to the sense amplifier 101-3 etc. through the inverter 203.

Figure 3:
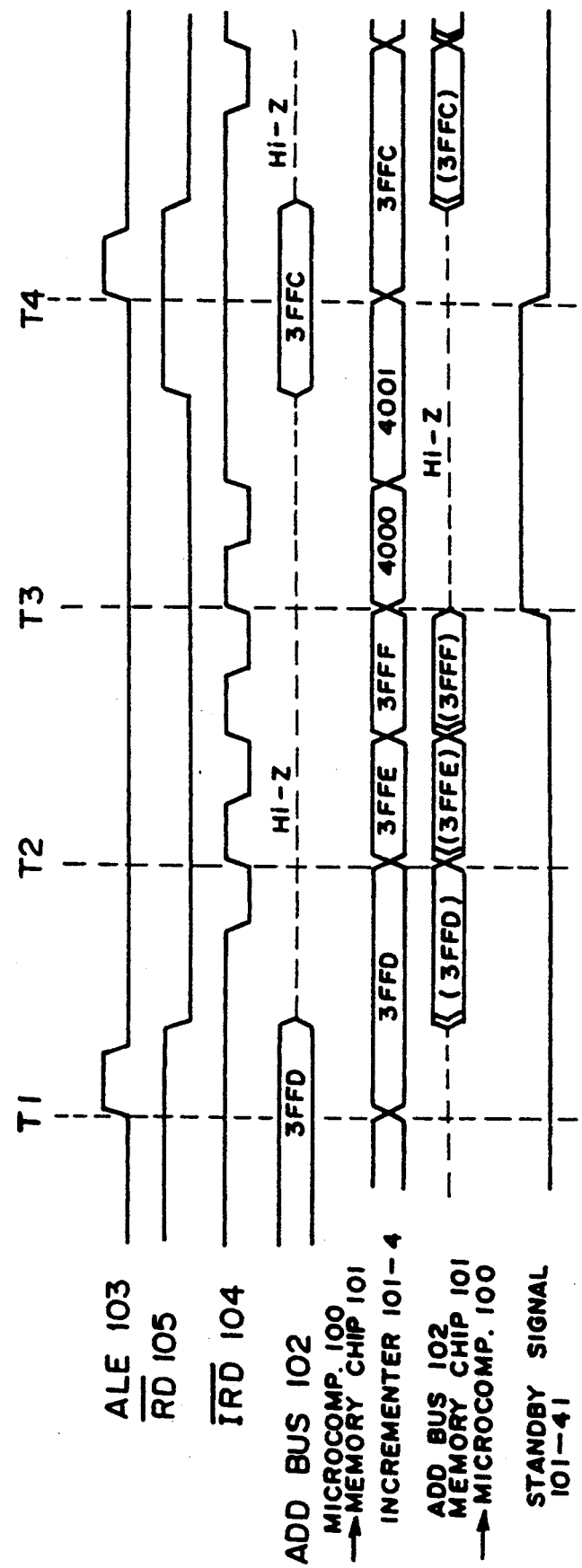
FIG. 3 shows a timing chart illustrating an operation of the microcomputer applied system of the first embodiment according to the present invention.

Next, explanation will be made, with reference to FIG. 3, as to the operation in the case where logical values "0" have been previously set to the memory addressing registers 201-1 and 201-2, the memory address 101-2 has been assigned to the address 0000-3FFF and another memory chip (not shown in FIG. 1) has been assigned to the address 4000-7FFF. FIG. 3 is a timing chart showing an operation in the case where the microcomputer 100 reads out instruction codes sequentially from an address 3FFD and executes a jump from an address 4001 to an address 3FFC. At a timing T1 in the figure, a data on the AD bus 102 is latched in the address latch 101-6 by means of ALE signal 103 and is transferred to the incrementer 101-5. At a timing T2 in the figure, in synchronization with the rising of the $\overline{IRD}$ signal 104, the incrementer 104-4 increments an output of the address latch 101-6 so that contents of the address 3FFE are read out and outputted to the AD bus 102. At a timing T3 in FIG. 3, the increment action continues and incrementer 101-4 specifies the address 4000 so that the standby signal 101-41 becomes a logical value "1" and the memory chip 101 assumes a standby state. The microcomputer 100 executes a jump to an address 3FFC at a timing T4 so that the address decoder 101-4 detects this jump and sets the standby signal 101-41 at a logical value "0" to release the standby state and return to a normal state.

Figure 4:
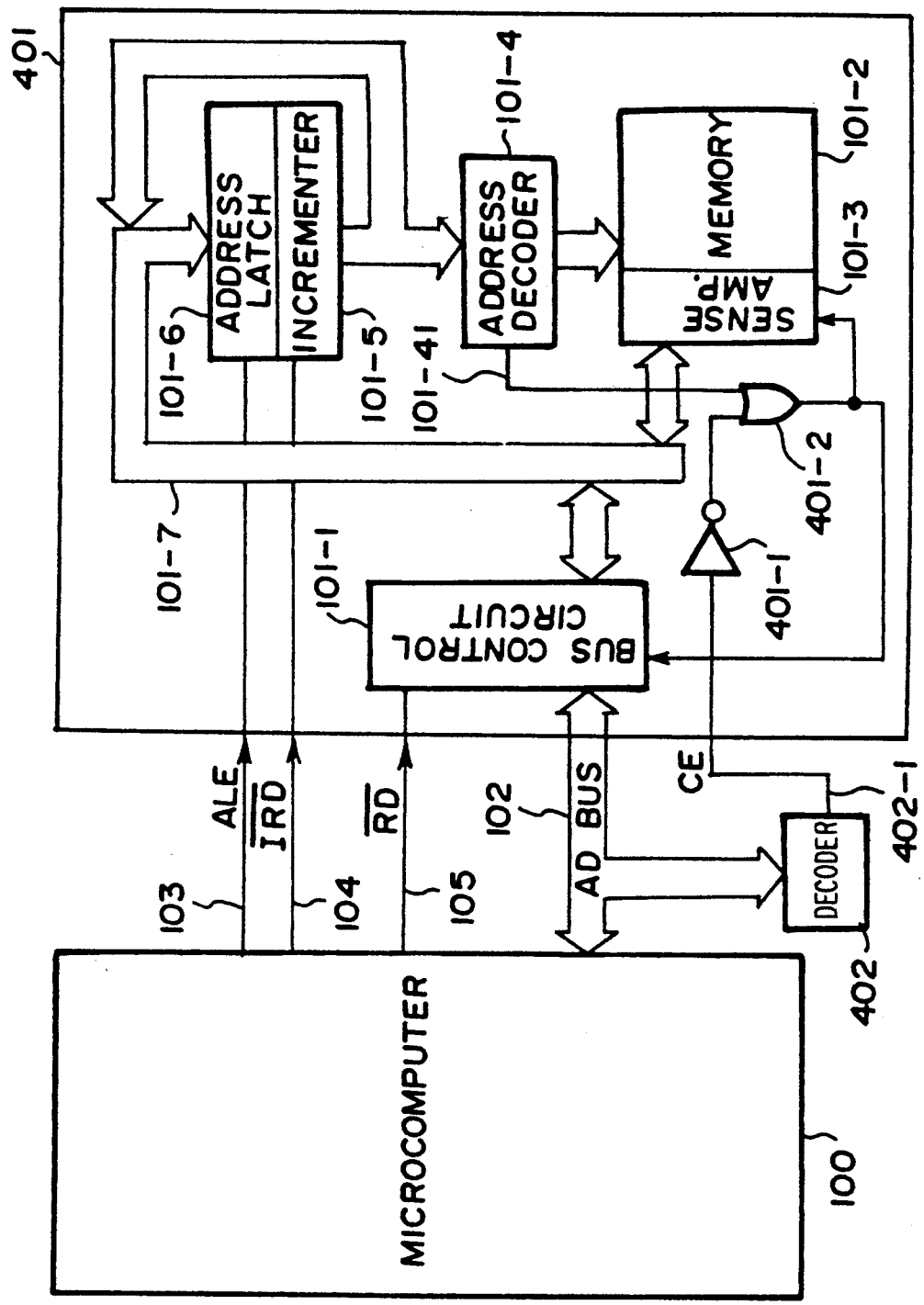
FIG. 4 shows a schematic view of a microcomputer applied system including a memory device as a second embodiment according to the present invention.

FIG. 4 shows a schematic view of a microcomputer applied system including a memory device as a second embodiment according to the present invention. The difference from the first embodiment is that, in this second embodiment wherein the memory chip 401 is used as a conventional memory which does not fetch instruction codes continuously, a memory chip 401 as a memory device of the present invention has a built-in CE terminal through which an external address decoder 402 can set the memory device to a standby state. The memory chip 401 includes an inverter 401-1 and an OR gate 401-2. In this figure, the same or similar elements to those in the first embodiment are referred to with similar reference symbols or numerals in FIG. 1. The external address decoder 402 identifies an address on the AD bus 102. Namely, when the address decoder 402 detects that the address on the bus is one which is assigned to the memory chip 401, it outputs decoder signal 402-1. The decoder output 402-1 is inputted to the CE terminal, passes through the inverter 402-1, and is combined, at the OR gate 401-2, with a standby signal 101-41 in the memory chip 401 to control a standby state of the memory chip 401. The difference from the first embodiment is that, in the second embodiment, even when the microcomputer 100 turns to a standby state after the computer outputs the address in the memory chip 401, it is possible to set the memory chip 401 to a standby state by way of controlling the external circuit.

While the preferred embodiments of the present invention have been shown and described, it is to be understood that those disclosures are for the purpose of illustration and the words which have been used are words of description rather than limitation, and that various changes and modifications may be made without departing from the scope of the present invention as set forth in the appended claims.

What is claimed is:

1. A memory device in which a memory means, an address means having an increment means and an address decoding means are installed on the same semiconductor substrate, said address decoding means comprising:
   a mapping means which assigns said memory means to a predetermined address; and
   a standby means which detects whether said address means is specifying an address assigned by said mapping means and which outputs a standby signal to set said memory device to a standby state of low power consumption when said standby means does not detect said address means specifying said address assigned by said mapping means.

2. A memory device according to claim 1, in which said mapping means includes memory addressing registers and said standby means includes a standby signal inverter and incremental output inverters, AND gates and transfer gates, and a 2-4 decoder which decodes outputs of said memory addressing registers and whose outputs are connected to said transfer gates for selecting outputs of said AND gates in order to output said standby signal through said standby signal inverter.

3. A memory device according to claim 1, which includes a bus control circuit and a sense amplifier which are set to a standby state by said standby signal produced by said standby means.

4. A memory device according to claim 1, which further comprises a chip enable terminal through which an external circuit can set said memory device to a standby state of low power consumption.

5. A memory device according to claim 4, which further comprises an inverter to which is inputted a signal of said chip enable terminal, and an OR gate to which both an output signal of said inverter and said standby signal are inputted and which outputs a logical OR signal to set said memory device to a standby state.

* * * * *